United States Patent
DeLuca et al.

(10) Patent No.: US 8,484,158 B2
(45) Date of Patent: Jul. 9, 2013

(54) MANAGING INFORMATION ABOUT AVATARS ACROSS VIRTUAL WORLDS

(75) Inventors: Lisa Seacat DeLuca, San Francisco, CA (US); Martin A. Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/697,802

(22) Filed: Feb. 1, 2010

(65) Prior Publication Data

US 2011/0191289 A1 Aug. 4, 2011

(51) Int. Cl.
*G06F 17/30* (2006.01)

(52) U.S. Cl.
USPC .......................... 707/609; 707/756; 709/203

(58) Field of Classification Search
USPC .................. 707/758, 609; 715/757; 345/473, 345/474; 709/203
See application file for complete search history.

(56) References Cited

U.S. PATENT DOCUMENTS

| | | | |
|---|---|---|---|
| 5,191,522 A | 3/1993 | Bosco et al. | |
| 6,073,138 A | 6/2000 | De L'Etraz et al. | |
| 7,086,005 B1 * | 8/2006 | Matsuda ........................ | 715/706 |
| 7,236,973 B2 | 6/2007 | Kalthoff et al. | |
| 8,026,918 B1 * | 9/2011 | Murphy ......................... | 345/473 |
| 2002/0188497 A1 | 12/2002 | Cerwin | |
| 2004/0139070 A1 | 7/2004 | Dysart et al. | |
| 2006/0178968 A1 | 8/2006 | Jung et al. | |
| 2006/0178975 A1 | 8/2006 | Jung et al. | |
| 2007/0027917 A1 | 2/2007 | Ariel et al. | |
| 2007/0027930 A1 | 2/2007 | Alvarado et al. | |
| 2007/0214179 A1 | 9/2007 | Hoang | |
| 2007/0282677 A1 | 12/2007 | Carpenter | |
| 2008/0104084 A1 | 5/2008 | Chavda et al. | |
| 2008/0158232 A1 * | 7/2008 | Shuster ......................... | 345/474 |
| 2008/0208749 A1 | 8/2008 | Wallace et al. | |
| 2008/0307066 A1 * | 12/2008 | Amidon et al. ............... | 709/217 |
| 2009/0106347 A1 * | 4/2009 | Harwood et al. ............. | 709/203 |
| 2009/0158150 A1 * | 6/2009 | Lyle et al. ...................... | 715/706 |
| 2009/0198664 A1 * | 8/2009 | Hamilton et al. .................. | 707/4 |
| 2009/0210213 A1 * | 8/2009 | Cannon et al. ..................... | 704/2 |
| 2009/0235331 A1 * | 9/2009 | Dawson et al. ..................... | 726/4 |
| 2009/0259948 A1 * | 10/2009 | Hamilton, II et al. ......... | 715/757 |
| 2010/0023879 A1 * | 1/2010 | Finn et al. ...................... | 715/757 |
| 2010/0081508 A1 * | 4/2010 | Bhogal et al. .................... | 463/40 |
| 2010/0083308 A1 * | 4/2010 | Chang et al. ..................... | 725/37 |
| 2010/0100828 A1 * | 4/2010 | Khandelwal et al. ......... | 715/757 |
| 2010/0115427 A1 * | 5/2010 | Schroeter et al. ............. | 715/757 |
| 2010/0185640 A1 * | 7/2010 | Dettinger et al. ............. | 707/758 |
| 2011/0007079 A1 * | 1/2011 | Perez et al. .................... | 345/473 |

\* cited by examiner

*Primary Examiner* — James Trujillo
*Assistant Examiner* — Thong Vu
(74) *Attorney, Agent, or Firm* — Patterson & Sheridan, LLP

(57) ABSTRACT

Techniques are disclosed for managing relationship information across virtual worlds. In one embodiment, information about avatars in virtual worlds is received. A correlation is derived between two avatars based on the received information. The derived correlation between the two avatars is stored and queried by one or more applications.

21 Claims, 5 Drawing Sheets

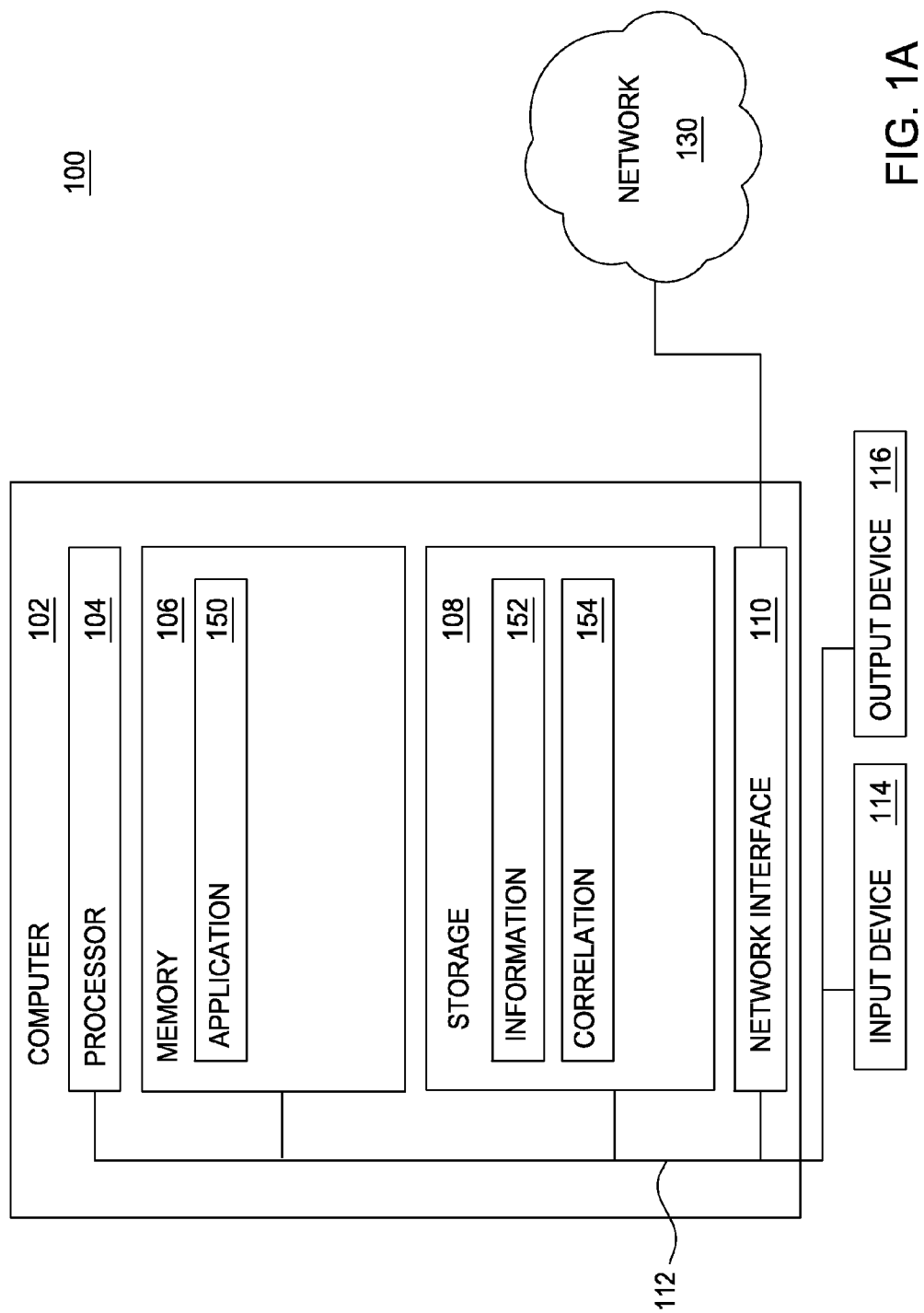

MANAGING INFORMATION ABOUT AVATARS ACROSS VIRTUAL WORLDS

BACKGROUND

1. Field of the Invention

Embodiments of the invention relate to the use of immersive visual environments. More specifically, embodiments of the invention relate to techniques for managing information about avatars across virtual worlds.

2. Description of the Related Art

A virtual world is a simulated environment which users may inhabit and interact with virtual objects and locations of the virtual world. Users may also interact with one another via avatars. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like. Virtual environments are typically presented as images on a display screen.

Some virtual worlds are described as being persistent. A persistent world provides an immersive environment (e.g., a fantasy setting used as a setting for a role-playing game, or a virtual world complete with land, buildings, towns, and economies) that is generally always available, and where events continue to occur, regardless of the presence of a given avatar. Thus, unlike non-persistent online games or multi-user environments, the virtual world continues to exist, and plots and events continue to unfold as users enter (and exit) the virtual world.

SUMMARY

One embodiment of the invention includes a computer-implemented method. The method may generally include configuring one or more computer processors to perform an operation. The operation may generally include receiving, from a plurality of virtual worlds, avatar profiles describing avatars from the plurality of virtual worlds; correlating information from a first avatar profile with information from a second avatar profile; storing the correlation between the first avatar profile and the second avatar profile.

Another embodiment of the invention includes a computer-readable storage medium containing a program, which, when executed on a processor, performs an operation. The operation may generally include receiving, from a plurality of virtual worlds, avatar profiles describing avatars from the plurality of virtual worlds; correlating information from a first avatar profile with information from a second avatar profile; storing the correlation between the first avatar profile and the second avatar profile.

Still another embodiment includes a system having one or more computer processors and a memory containing a program, which when executed by the one or more computer processors is configured to perform an operation. The operation may generally include receiving, from a plurality of virtual worlds, avatar profiles describing avatars from the plurality of virtual worlds; correlating information from a first avatar profile with information from a second avatar profile; storing the correlation between the first avatar profile and the second avatar profile.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 1A-1B are block diagrams illustrating a system for managing information about avatars across virtual worlds, according to one embodiment of the invention.

DETAILED DESCRIPTION OF THE PREFERRED EMBODIMENTS

Figure 1B:
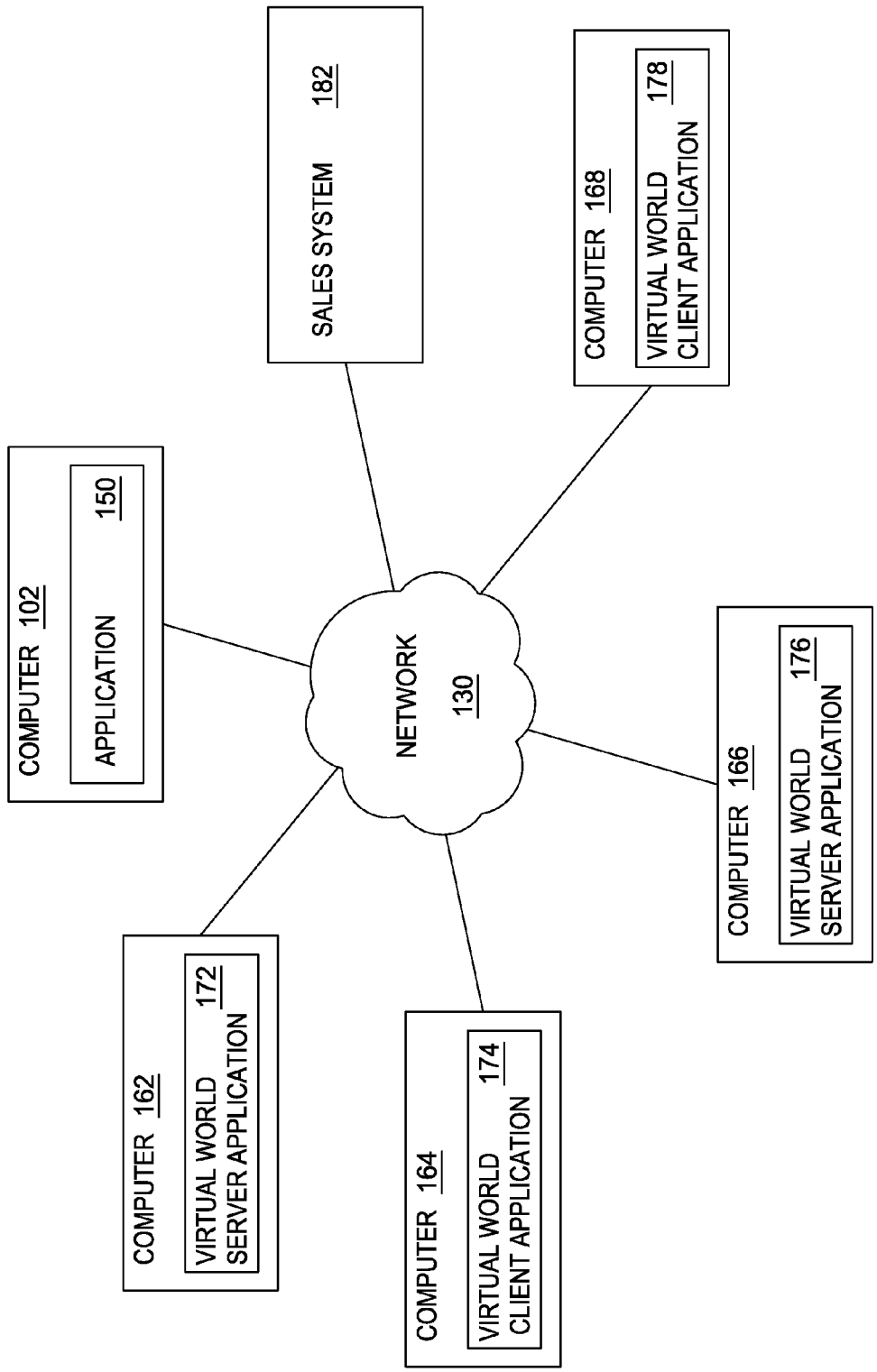

Embodiments of the invention provide techniques for managing relationship information across virtual worlds. One embodiment of the invention provides an application configured to correlate identities behind (e.g., users of) avatars based on received information about the avatars. For example, in one embodiment, the application may detect and/or correct duplicate entries for a specific user and/or avatar. In one embodiment, the application may receive information about avatars in virtual worlds. The application may derive correlations between the avatars (e.g., of distinct virtual worlds). The application may store the derived correlations. Other applications may query the derived correlations to discover new marketing opportunities, to detect fraud, etc. The application (and/or the other applications) may select advertisements to present to a particular user based on the derived information. Generally, managing information about avatars across virtual worlds may allow a virtual world operator to identify marketing opportunities for user.

In one embodiment, the application may be a master data management application. For example, the application may consistently define and manage non-transactional data of an organization (also called reference data and/or master data). The application may include processes for collecting, aggregating, matching, consolidating, quality-assuring, persisting and distributing the data throughout the organization to ensure consistency and control in the ongoing maintenance and use of the data (e.g., by applications). The application may also manage and interlink reference data that is shared by different systems and used by different groups within an organization. Examples of reference data include data about customers, products, employees, inventory, suppliers, etc. The application may also enforce integrity of the reference data.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a block diagram illustrating a system 100 for managing information about avatars across virtual worlds, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150. As described above, the application 150 may be a master data management (MDM) application. The application 150 may communicate, via the network 130, with virtual world server applications executing on other computers connected to the network 130. The storage 108 of the computer 102 includes information 152 about avatars of virtual worlds and a correlation 154 derived between avatar-specific profiles (or avatar profiles) describing avatars from the virtual worlds. The application 150 may receive and/or store the information 152 in the avatar profiles. The information 152 may describe, without limitation, an avatar and/or past actions of the avatar (e.g., what products the avatar has purchased). Further, the application 150 may modify the avatar profiles to include a correlation 154 derived between the avatar profiles, according to one embodiment.

In one embodiment, the correlation between the first avatar profile and the second avatar profile reveals that avatars of the first avatar profile and of the second avatar profile belong to the same user. The correlation between the first avatar profile and the second avatar profile may also reveal that the user has purchased a product or a service in another virtual world of the plurality of virtual worlds. Further, the correlation between the first avatar profile and the second avatar profile may reveal a relationship between respective users of avatars described by the first avatar profile and the second avatar profile, a virtual relationship between the avatars described by the first avatar profile and the second avatar profile, etc.

FIG. 1B is a block diagram illustrating a system 180 for managing information about avatars across virtual worlds, according to one embodiment of the invention. The system 180 includes computers 102, 162, 164, 166, 168 and a sales system 182 connected via the network 130. The computer 162 executes a virtual world server application 172. The computer 164 executes a virtual world client application 174 for the virtual world server application 172. The computer 166 executes another virtual world server application 176. The computer 168 executes a virtual world client application 178 for the another virtual world server application 176.

In one embodiment, a user may participate as an avatar in a virtual world provided by the virtual world server application 172 and the virtual world client application 174. Further, the same user (or alternatively, another user) may participate as another avatar in a virtual world provided by the virtual world server application 176 and the virtual world client application 178. The application 150 may receive, from the virtual world server applications 172, 176, information 152 about the avatars of the virtual worlds. The application 150 may derive correlations between avatars based on the received information 152. In one embodiment, the correlated avatars are from distinct virtual worlds. Other applications, such as the sales system 182, may then query the application 150 for the derived correlations. For example, results from executing the query may guide advertising to a particular avatar and/or user.

Figure 2:
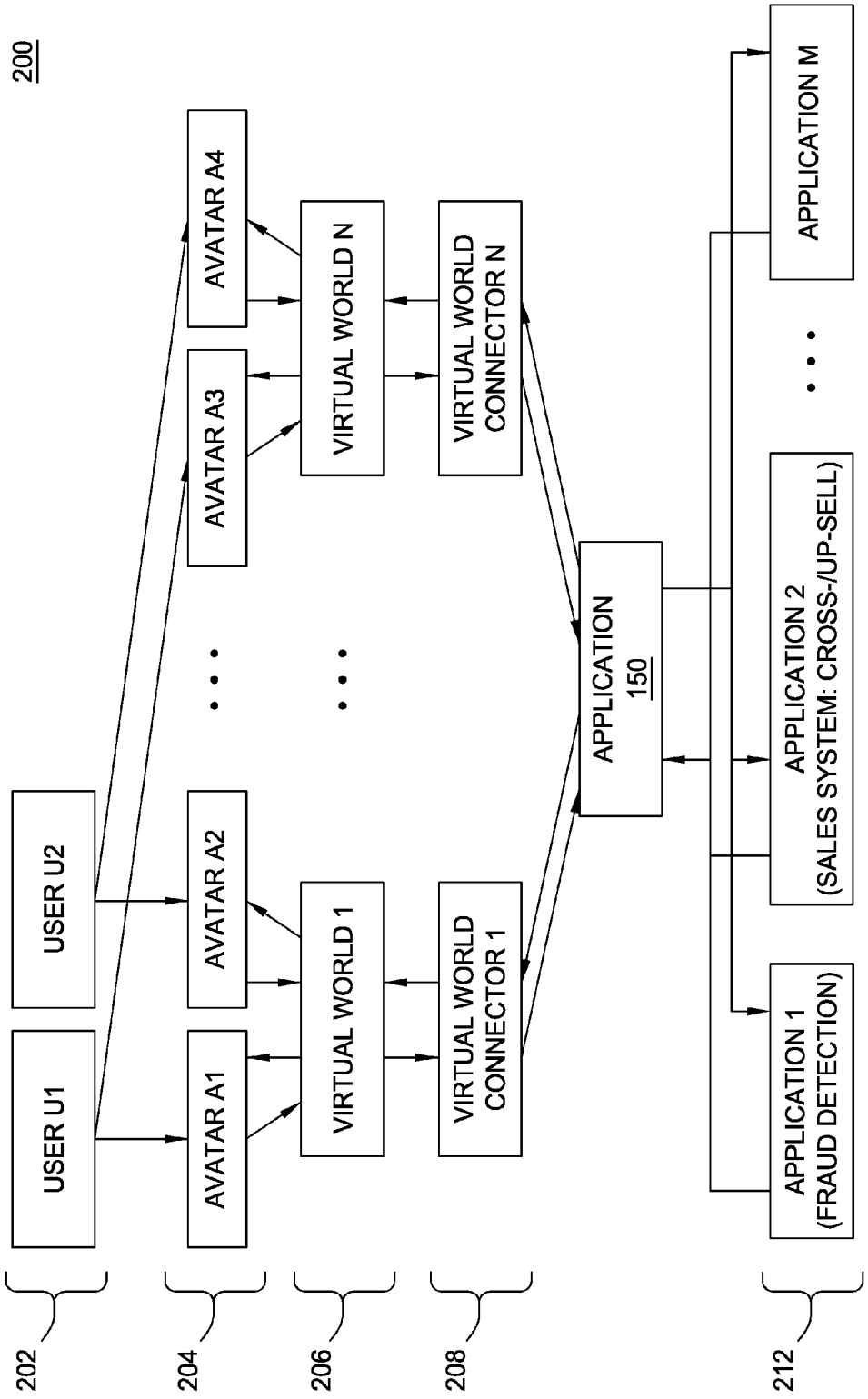
FIG. 2 illustrates an architectural view of a networked system for managing information about avatars across virtual worlds, according to one embodiment of the invention.

FIG. 2 illustrates an architectural view 200 of the networked system 100 of FIG. 1B, according to one embodiment of the invention. As shown, each virtual world 206 includes avatars 204. The application 150 may receive information 152 about the avatars 204 from the virtual worlds 206 and via virtual world connectors 208. The information may have been supplied to the virtual worlds 206 from users 202.

For example, in the course of creating and/or using an avatar 204 in a virtual world 206, a user 202 may provide information about the user 202 and/or about the avatar 204 to the virtual world 206. The information may include a name of the user 202, a name for the avatar 204, contact information for the user 202, etc. Further, the user 202 may also provide information about the user 202 and/or about the avatar 204 to the virtual world 206 via activity of the user in the virtual world 206. An example of an activity of the user 202 in the virtual world 206 is purchasing a product or service via the virtual world 206. For example, the user may purchase footwear or order a magazine subscription via the virtual world 206.

As shown, each virtual world connector 208 may be specific to a virtual world 206. Each virtual world connector 208 may communicate with the respective virtual world 206 using a messaging protocol of the respective virtual world 206. Further, each virtual world connector 208 may communicate with the application 150 using a messaging protocol used by the application 150. Examples of the messaging protocol used by the application 150 include Java™ Message Service, web services, IBM® WebSphere® MQ, Java™ Remote Method Invocation, etc.

As is known, Java™ Message Service (JMS) refers to a messaging standard that allows application components based on the Java™ 2 Platform, Enterprise Edition (J2EE™) to create, send, receive, and read messages. As is known, web services refer to software components capable of being accessed via standard network protocols using a standardized messaging system. As is known, IBM® WebSphere® MQ refers to a message-oriented middleware that allows independent applications of a distributed system to communicate with one another. As is known, Java™ Remote Method Invocation (RMI) refers to a messaging standard that performs an object-oriented equivalent of remote procedure calls (RPC). Of course, those skilled in the art will recognize that the protocols used by the virtual world connectors 208 and/or the application 150 may be tailored to suit the needs of a particular case.

In one embodiment, the virtual world connectors 208 use the protocols to transmit information (e.g., information updates for an avatar) between the application 150 and the virtual worlds 206. Each avatar 204 may have a corresponding user 202. Further, each user 202 may control a distinct avatar 204 in multiple virtual worlds 206. That is, a user may have created a different profile, persona, username etc., for participating in multiple virtual environments. Similarly, a given user 202 may create multiple accounts and/or avatars 204 for use within a single one of the virtual worlds 206.

In one embodiment, the application 150 stores the information received about the avatars 204 (e.g., according to a data model of the application 150). Further, the application 150 resolves the information 152 received about the avatars 204 to derive a correlation 154 between two avatars. For example, the correlation 154 may reveal that the user 202 of the avatar 204 is related to (e.g., is a real and/or virtual family member of) a second user of a second avatar. As another example, the correlation 154 may reveal that the user 202 of the avatar 204 has purchased a product in a second virtual world (e.g., via an avatar of that user created for the second virtual world.). The product may be a real world product or a virtual product. In one embodiment, the application 150 may correlate the information about the user of such avatars across multiple virtual environments in order to select advertisements to present to the user 202 of the avatar 204. More generally, the correlation between avatar profiles indicates which products or services are purchased by a common user.

Further, other applications 212 may communicate with the application 150 (e.g., via the network 130) to select advertisements to present to the user 202 of the avatar 204. For example, the application 212 may attempt to up-sell and/or up-sell to the user 202 (or related users), based on the correlation 154. As is known, up-selling refers to a technique for marketing to a user an enhancement for a product (or a more expensive version of the product) that the user is interested in purchasing. Cross-selling refers to a technique for marketing to a user products related to a product that the user is interested in purchasing (or has already purchased).

In one embodiment, applications 212 may query the application 150 to identify users most likely to be receptive to a particular advertisement. For example, the other applications 212 may query the application 150 to identify users who have purchased a specific product (or service) within the previous six months. The application 150 may generate results for the query based on both the received information about avatars and the correlation derived between avatars. The application 150 may return the results to the other applications 212.

For example, the application 150 may determine that the user 202 has purchased seven out of eight pairs of running shoes from a line of running shoes. In such a case, the application 150 could advertise to the user the remaining pair from the line of running shoes (that the user has not yet purchased). As another example, the application 150 may determine that a family member related to user 202 has a history of purchasing a particular brand of jeans (e.g., "ABC Jeans") via a virtual world. Suppose that the user 202 visits an ABC Jeans store in the virtual world 206 using the avatar 204. The application 150 (and/or the virtual world 206) may prompt the user 202 whether the user desires to purchase a pair of the latest style of ABC Jeans for related family member (or for the user 202). The application 150 may also offer the user 202 a discount based on the correlation 154 (e.g., based on the relationship between the user 202 and the related family member). Of course, those skilled in the art will recognize that the ways of advertising to a user based on correlation derived between avatars may be tailored to suit the needs of a particular case.

Further, while embodiments herein are described with reference to advertising to a user based on the correlation 154, other ways of using the correlation 154 are broadly contemplated without departing from the scope of the invention. For example, in one embodiment, one of the applications 212 may be configured to detect fraud in processing insurance claims for the user 202. Thus, the other application 212 may more effectively detect fraud based on the correlation 154 derived for the avatars across virtual worlds. As another example, a virtual world may share, with other users of the virtual world and upon the request of the user, the correlation derived involving the user. Thus, the user may more effectively manage a network of real-world and virtual relationships of the user. Generally, the information stored by the application 150 may be combined with other data sources (such as customer, employee, vendor, and/or criminal databases, etc.) to derive a correlation between users of interest.

Figure 3:
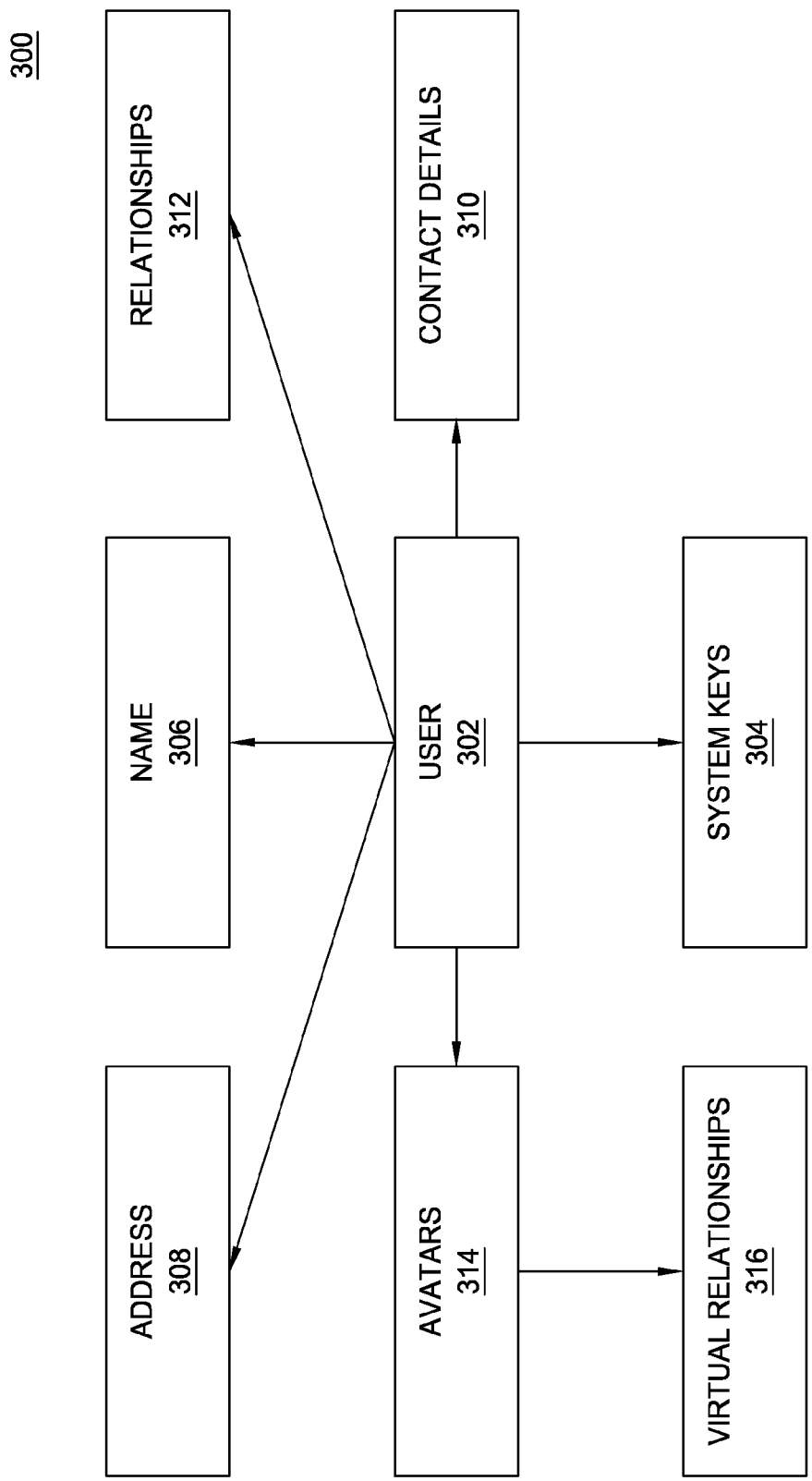
FIG. 3 illustrates a data model for the networked system, according to one embodiment of the invention.

FIG. 3 illustrates an overview of the data model 300 for storing information correlated across virtual worlds, according to one embodiment of the invention. As shown, the entities 300 include user 302. The application 150 may store information about each user 302. For example, the application 150 may store a name 306, an address 308, and contact details 310 for each user 302. The application 150 may also store relationships 312 of the user 302 (e.g., spouse, father, sibling, etc.). The relationships may include those provided explicitly by a user and/or those derived by the application 150 for the avatars.

Further, the application 150 may store avatars 314 of the user 302. The application 150 may also store virtual relationships 316 of each avatar 314 (e.g., other members of a guild in the virtual world to which an avatar 314 belongs). The application 150 may also assign and store system keys 304 for each user 302. In one embodiment, the system keys 304 uniquely identify each distinct user of the virtual worlds 206

Of course, those skilled in the art will recognize that the way of transmitting information about avatars between the virtual worlds 206 and the application 150 may be tailored to suit the needs of a particular case. Further, the way in which the application 150 stores information received about avatars may also be tailored to suit the needs of a particular case. For example, in one embodiment, the application 150 stores users 302 as key entities according to the data model for the application 150. Whenever a new user creates a new avatar, the application 150 creates a new entity representing the new user in the MDM system 100. The application 150 may also assign a unique identifier for each distinct avatar. The application 150 may store the unique identifier for each avatar as an entity representing system keys 304 of the data model.

Further, the application 150 may store a name as an entity representing names 306 of the data model. When the user provides information about the user and/or the avatar (e.g., name of the user, address, contact information such as phone number and/or email address, etc.) the application may update the instance of the user and/or avatar accordingly. The application 150 may also link the avatar and the user with a relationship type of "is avatar of." Further, the application 150 may detect and eliminate duplicates in the stored entities. For example, the application 150 may prevent two avatars of a single user in two virtual worlds from resulting in two separate user entries representing the single user. Instead, the application 150 may link both avatars to a single entry representing the user.

In one embodiment, the application 150 may also standardize the information received about the avatars. For example, the application 150 may standardize name and/or address information for users of the avatars. Alternatively, each virtual world connector 208 may invoke a component to standardize information received from the virtual worlds 206. The virtual world connectors 208 may then transmit the standardized information to the application 150. By storing standardized information about the avatars across virtual worlds, the application 150 may more effectively process queries from other applications 212 for specific information about a user and/or avatar. For example, the application 150 may more effectively derive relationships between users based on standardized information such as last name, mailing address, phone number, etc. The application 150 may also derive the relationships from gender and age information for a user. Examples of derived relationships include "is parent of," "is brother of," "is spouse of," etc.

Figure 4:
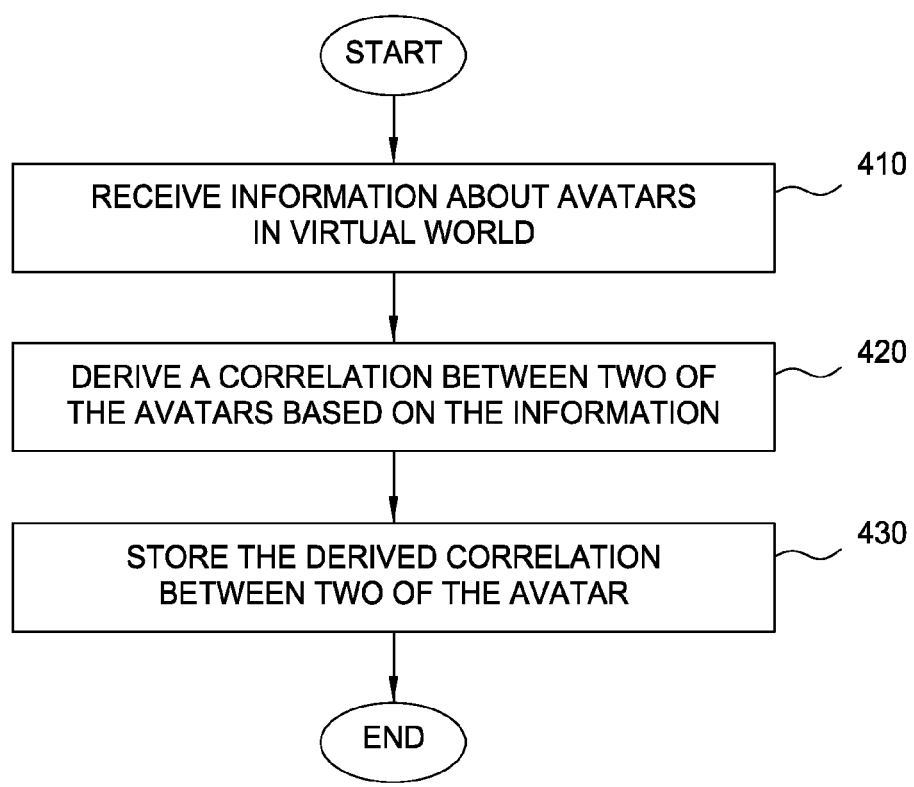
FIG. 4 is a flowchart depicting a method for managing information about avatars across virtual worlds, according to one embodiment of the invention.

FIG. 4 is a flowchart depicting a method 400 for managing information about avatars across virtual worlds, according to one embodiment of the invention. As shown, the method 400 begins at step 410, where the application 150 receives information 152 about avatars in virtual worlds, via a connector application specific to each virtual world. At step 420, the application 150 resolves the information 152 about avatars to derive a correlation 154 between avatars (e.g., by correlating avatar profiles describing the avatars). For example, the correlation 154 may reveal that the user has purchased a specific product (via another avatar and/or virtual world). The correlation 154 may also reveal that the user is related to another user who has purchased a specific product. At step 430, the application 150 (or another application communicating with the application 150 via the network 130) advertises to a user of the avatar based on the correlation 154. For example, the application may advertise a product based on products previously purchased by the user (and/or by users related to the user). The application 150 may update avatar-specific profiles to include the derived correlation. For example, the application 150 may update avatar-specific profiles to depict a user common to avatars from distinct virtual worlds. After the step 430, the method 400 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for managing information about avatars across virtual worlds. One embodiment of the invention provides a master data management (MDM) application. In one embodiment, the application may receive information about avatars in virtual worlds. The application may resolve the information about the avatars to derive correlations between avatars. The application may advertise to a user of the avatar based on the correlations. Accordingly, managing information about avatars across virtual worlds may identify opportunities for marketing to a user.

While the foregoing is directed to embodiments of the present invention, other and further embodiments of the invention may be devised without departing from the basic scope thereof, and the scope thereof is determined by the claims that follow.

What is claimed is:

1. A computer-implemented method to derive relationships between avatars across a plurality of virtual environments, each virtual environment provided by a respective server application communicably connected to a management application via a respective connector application, the method comprising:

receiving avatar information from each virtual environment via the respective connector application, wherein each connector application is configured to communicate according to a different messaging protocol specific to the server application providing the respective virtual environment, wherein the received avatar information includes information elements pertaining to a first avatar from a first virtual environment and a second avatar from a second virtual environment, respectively;

generating, based on the received avatar information and for each of the first avatar and the second avatar, an avatar entity identifying the respective avatar and the virtual environment of the respective avatar;

upon determining, based on the generated avatar entities, that the first avatar and the second avatar are used by a single user, generating, by operation of one or more computer processors when executing the management application, a single user entity identifying the single user and associated with each of the generated avatar entities, wherein the single user entity and the avatar entities are stored according to a predetermined data model; and responsive to receiving a request from a requesting entity to retrieve information elements of the single user across the plurality of virtual environments, generating, based on the single user entity, a result set that includes the information elements pertaining to the first and second avatars, respectively, wherein the generated result set is output to the requesting entity.

2. The computer-implemented method of claim 1, wherein the information element pertaining to the each avatar of the first and second avatars specifies at least one purchase made for the respective avatar.

3. The computer-implemented method of claim 2, further comprising:

upon determining, based on the generated avatar entities, that the first avatar and the second avatar are used respectively by two users who are related to each other, generating, for each of the two related users, a user entity identifying the respective user and associated with: (i) the avatar entity for the avatar of the respective user and (ii) the user entity generated for the other of the two related users; wherein the user entity for each of the two related users specifies a relationship type characterizing how the two users are related, wherein the relationship type is determined based on the received avatar information.

4. The computer-implemented method of claim 3, further comprising:

upon determining, based on the generated avatar entities, that the first avatar and the second avatar are used respectively by two users who are not related to each other, generating, for each of the two unrelated users, a user entity identifying the respective user and associated with the avatar entity for the avatar of the respective user.

5. The computer-implemented method of claim 4, wherein each avatar has a plurality of attributes, each attribute selected from the user name, the avatar name, user age, user gender, phone number, mailing address, email address, and network address, wherein at least one attribute is standardized to facilitate attribute matching.

6. The computer-implemented method of claim 5, wherein the first avatar and the second avatar are determined to be used by the single user based on a first predefined count of matching attributes between the first avatar and the second avatar, wherein the first predefined count is equal to or less than a count of the plurality of attributes;
wherein the first avatar and the second avatar are determined to be used respectively by the two users who are related based on a second predefined count of matching attributes between the first avatar and the second avatar, wherein the second predefined count is less than the first predefined count;
wherein the first avatar and the second avatar are determined to be used respectively by the two users who are unrelated based a third predefined count of matching attributes between the first avatar and the second avatar, wherein the third predefined count is less than the second predefined count.

7. The computer-implemented method of claim 6, wherein each server application comprises a virtual world server, wherein each virtual environment comprises a virtual world provided by a respective virtual world server, wherein each connector application comprises a virtual world connector application, wherein the requesting entity comprises a client application of a plurality of distinct types of client applications, each communicably connected to the management application, wherein the management application comprises a master data management application, wherein each avatar entity and the each user entity are stored in a master data store associated with the master data management application;
wherein each avatar is identifiable by a respective avatar name, wherein each user is identifiable by a respective user name, wherein the plurality of virtual world servers includes at least four different virtual world servers that communicate according to four different messaging protocols, respectively, wherein the four different messaging protocols include Java Message Service (JMS), Java Remote Method Invocation (RMI), WebSphere MQ, and web service, wherein the master data management application is configured to independently generate a respective result set for each individual purchase selected from: purchase of a virtual good, purchase of a virtual service, purchase of a real good, and purchase of a real service, wherein the first avatar is not from the second virtual environment, wherein the second avatar is not from the first virtual environment.

8. A computer program product to derive relationships between avatars across a plurality of virtual environments, each virtual environment provided by a respective server application communicably connected to a management application via a respective connector application, the computer program product comprising:
a computer-readable storage medium having computer-readable program code embodied therewith, the computer-readable program code comprising:
computer-readable program code configured to receive avatar information from each virtual environment via the respective connector application, wherein each connector application is configured to communicate according to a different messaging protocol specific to the server application providing the respective virtual environment, wherein the received avatar information includes information elements pertaining to a first avatar from a first virtual environment and a second avatar from a second virtual environment, respectively;
computer-readable program code configured to generate, based on the received avatar information and for each of the first avatar and the second avatar, an avatar entity identifying the respective avatar and the virtual environment of the respective avatar;
computer-readable program code included in the management application and configured to, upon determining, based on the generated avatar entities, that the first avatar and the second avatar are used by a single user, generate, by operation of one or more computer processors when executing the management application, a single user entity identifying the single user and associated with each of the generated avatar entities, wherein the single user entity and the avatar entities are stored according to a predetermined data model; and
computer-readable program code configured to, responsive to receiving a request from a requesting entity to retrieve information elements of the single user across the plurality of virtual environments, generate, based on the single user entity, a result set that includes the information elements pertaining to the first and second avatars, respectively, wherein the generated result set is output to the requesting entity.

9. The computer program product of claim 8, wherein the information element pertaining to the each avatar of the first and second avatars specifies at least one purchase made for the respective avatar.

10. The computer program product of claim 9, wherein the computer-readable program code further comprises:
computer-readable program code configured to, upon determining, based on the generated avatar entities, that the first avatar and the second avatar are used respectively by two users who are related to each other, generate, for each of the two related users, a user entity identifying the respective user and associated with: (i) the avatar entity for the avatar of the respective user and (ii) the user entity generated for the other of the two related users; wherein the user entity for each of the two related users specifies a relationship type characterizing how the two users are related, wherein the relationship type is determined based on the received avatar information.

11. The computer program product of claim 10, wherein the computer-readable program code further comprises:
computer-readable program code configured to, upon determining, based on the generated avatar entities, that the first avatar and the second avatar are used respectively by two users who are not related to each other, generating, for each of the two unrelated users, a user entity identifying the respective user and associated with the avatar entity for the avatar of the respective user.

12. The computer program product of claim 11, wherein each avatar has a plurality of attributes, each attribute selected from the user name, the avatar name, user age, user gender, phone number, mailing address, email address, and network address, wherein at least one attribute is standardized to facilitate attribute matching.

13. The computer program product of claim 12, wherein the first avatar and the second avatar are determined to be used by the single user based on a first predefined count of matching attributes between the first avatar and the second avatar, wherein the first predefined count is equal to or less than a count of the plurality of attributes;

wherein the first avatar and the second avatar are determined to be used respectively by the two users who are related based on a second predefined count of matching attributes between the first avatar and the second avatar, wherein the second predefined count is less than the first predefined count;

wherein the first avatar and the second avatar are determined to be used respectively by the two users who are unrelated based a third predefined count of matching attributes between the first avatar and the second avatar, wherein the third predefined count is less than the second predefined count.

14. The computer program product of claim 13, wherein each server application comprises a virtual world server, wherein each virtual environment comprises a virtual world provided by a respective virtual world server, wherein each connector application comprises a virtual world connector application, wherein the requesting entity comprises a client application of a plurality of distinct types of client applications, each communicably connected to the management application, wherein the management application comprises a master data management application, wherein each avatar entity and the each user entity are stored in a master data store associated with the master data management application;

wherein each avatar is identifiable by a respective avatar name, wherein each user is identifiable by a respective user name, wherein the plurality of virtual world servers includes at least four different virtual world servers that communicate according to four different messaging protocols, respectively, wherein the four different messaging protocols include Java Message Service (JMS), Java Remote Method Invocation (RMI), WebSphere MQ, and web service, wherein the master data management application is configured to independently generate a respective result set for each individual purchase selected from: purchase of a virtual good, purchase of a virtual service, purchase of a real good, and purchase of a real service, wherein the first avatar is not from the second virtual environment, wherein the second avatar is not from the first virtual environment.

15. A system to derive relationships between avatars across a plurality of virtual environments, each virtual environment provided by a respective server application communicably connected to a management application via a respective connector application, the system comprising:

one or more computer processors;

a memory containing a program, which when executed by the one or more computer processors is configured to perform an operation comprising:

receiving avatar information from each virtual environment via the respective connector application, wherein each connector application is configured to communicate according to a different messaging protocol specific to the server application providing the respective virtual environment, wherein the received avatar information includes information elements pertaining to a first avatar from a first virtual environment and a second avatar from a second virtual environment, respectively;

generating, based on the received avatar information and for each of the first avatar and the second avatar, an avatar entity identifying the respective avatar and the virtual environment of the respective avatar;

upon determining, based on the generated avatar entities, that the first avatar and the second avatar are used by a single user, generating a single user entity identifying the single user and associated with each of the generated avatar entities, by the management application, wherein the single user entity and the avatar entities are stored according to a predetermined data model; and responsive to receiving a request from a requesting entity to retrieve information elements of the single user across the plurality of virtual environments, generating, based on the single user entity, a result set that includes the information elements pertaining to the first and second avatars, respectively, wherein the generated result set is output to the requesting entity.

16. The system of claim 15, wherein the information element pertaining to the each avatar of the first and second avatars specifies at least one purchase made for the respective avatar.

17. The system of claim 16, wherein the operation further comprises:

upon determining, based on the generated avatar entities, that the first avatar and the second avatar are used respectively by two users who are related to each other, generating, for each of the two related users, a user entity identifying the respective user and associated with: the avatar entity for the avatar of the respective user and (ii) the user entity generated for the other of the two related users; wherein the user entity for each of the two related users specifies a relationship type characterizing how the two users are related, wherein the relationship type is determined based on the received avatar information.

18. The system of claim 17, wherein the operation further comprises:

upon determining, based on the generated avatar entities, that the first avatar and the second avatar are used respectively by two users who are not related to each other, generating, for each of the two unrelated users, a user entity identifying the respective user and associated with the avatar entity for the avatar of the respective user.

19. The system of claim 18, wherein each avatar has a plurality of attributes, each attribute selected from the user name, the avatar name, user age, user gender, phone number, mailing address, email address, and network address, wherein at least one attribute is standardized to facilitate attribute matching.

20. The system of claim 19, wherein the first avatar and the second avatar are determined to be used by the single user based on a first predefined count of matching attributes between the first avatar and the second avatar, wherein the first predefined count is equal to or less than a count of the plurality of attributes;

wherein the first avatar and the second avatar are determined to be used respectively by the two users who are related based on a second predefined count of matching attributes between the first avatar and the second avatar, wherein the second predefined count is less than the first predefined count;

wherein the first avatar and the second avatar are determined to be used respectively by the two users who are unrelated based a third predefined count of matching attributes between the first avatar and the second avatar, wherein the third predefined count is less than the second predefined count.

21. The system of claim 20, wherein each server application comprises a virtual world server, wherein each virtual environment comprises a virtual world provided by a respective virtual world server, wherein each connector application comprises a virtual world connector application, wherein the requesting entity comprises a client application of a plurality of distinct types of client applications, each communicably connected to the management application, wherein the management application comprises a master data management application, wherein each avatar entity and the each user entity are stored in a master data store associated with the master data management application; wherein each avatar is identifiable by a respective avatar name, wherein each user is identifiable by a respective user name, wherein the plurality of virtual world servers includes at least four different virtual world servers that communicate according to four different messaging protocols, respectively, wherein the four different messaging protocols include Java Message Service (JMS), Java Remote Method Invocation (RMI), WebSphere MQ, and web service, wherein the master data management application is configured to independently generate a respective result set for each individual purchase selected from: purchase of a virtual good, purchase of a virtual service, purchase of a real good, and purchase of a real service, wherein the first avatar is not from the second virtual environment, wherein the second avatar is not from the first virtual environment.

\* \* \* \* \*